Patented Mar. 22, 1927.

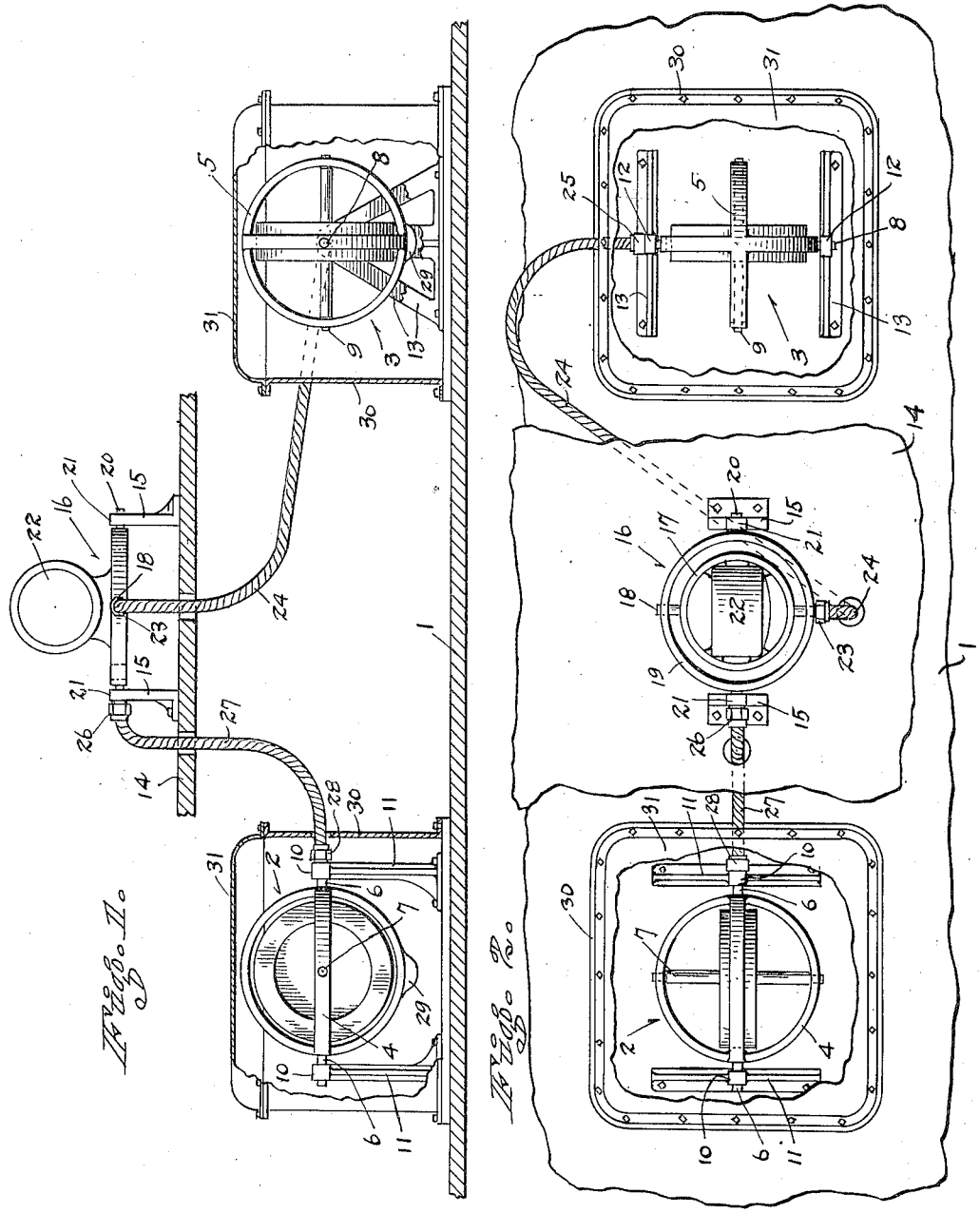

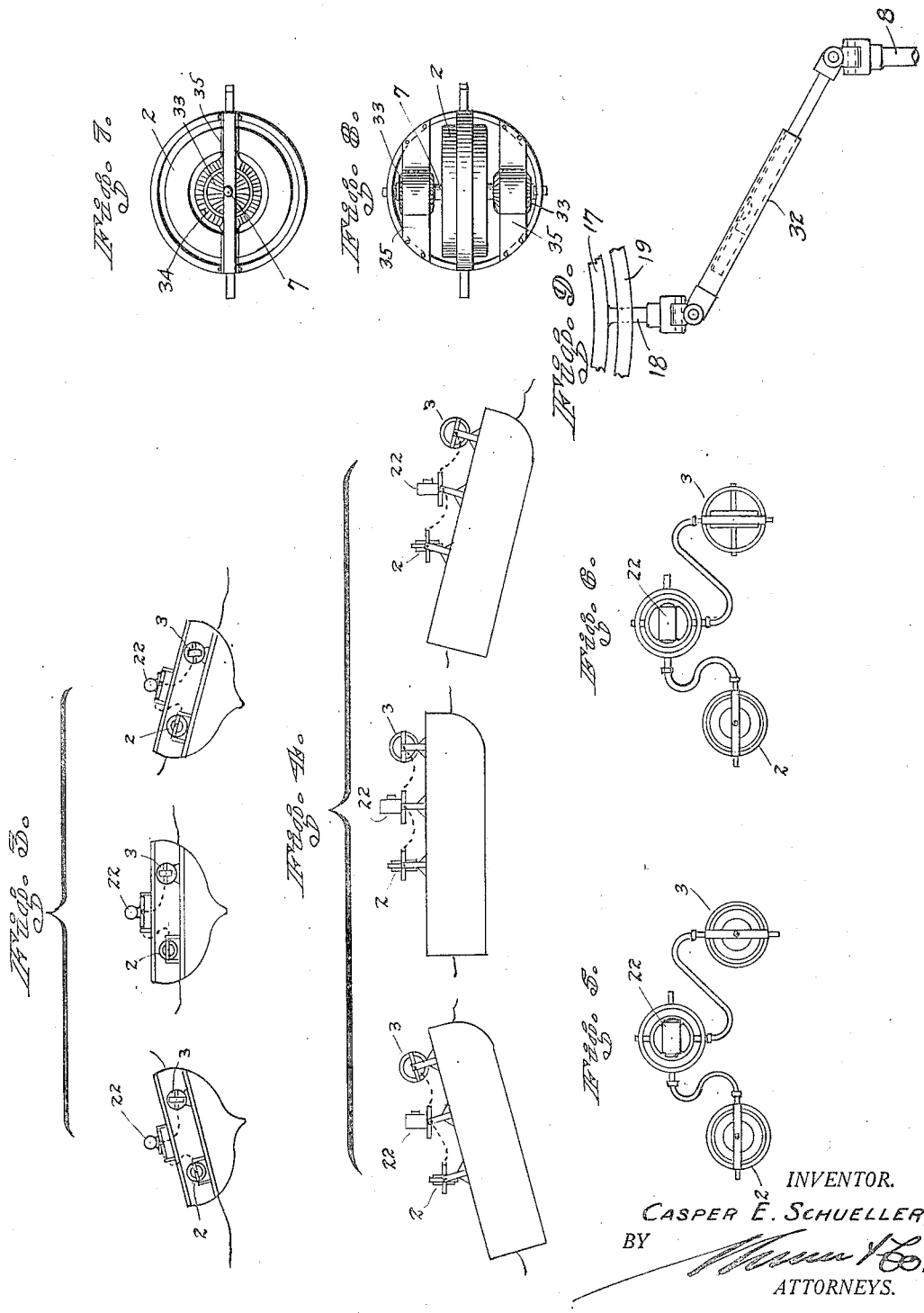

1,621,815

UNITED STATES PATENT OFFICE.

CASPER E. SCHUELLER, OF BERKELEY, CALIFORNIA.

GYROSCOPIC STABILIZER.

Application filed August 5, 1926. Serial No. 127,460.

My invention relates to gyroscopic devices employed in conjunction with the mountings of certain instruments, such as headlights, searchlights, cameras, or the like, on bodies adapted to move on land, in water or in the air, as, for example, automobiles, locomotives, ships or aeroplanes, which bodies are continually subjected to oscillatory movements both longitudinally and transversely, for the purpose of stabilizing such instruments and holding them in a relatively stationary, predetermined position during the oscillatory movements of such bodies.

The main object of the invention is to pivotally mount an instrument and to arrange gyroscopes on a moving body, as above referred to, and to connect them with the instrument mounting in such a manner that any movement tending to deflect the instrument from a predetermined position is instantaneously transmitted to the gyroscopes and counteracted by them, and that the gyroscopes' counteracting movement is instantaneously transmitted to the mounting, so that the instrument is thus steadily held in the predetermined position during all oscillating movements of the moving body.

Further objects and advantages will be understood from the following detailed description having reference to a preferred embodiment of the invention, as illustrated in the accompanying drawings, in which—

Figure 1 is a front elevation of two gyroscopes mounted on a deck or other support of a moving body and connected with the mounting of a searchlight according to the principle of my invention, the housings for the gyroscopes being broken in order to show interior parts:

Figure 2 is a plan of Figure 1, the tops of the housings being broken in order to show more clearly the arrangement of the gyroscopes:

Figure 3 is a diagrammatic front view of my invention, as applied to a deck of a ship, and shows how the instrument is maintained in the same position, whether the ship's deck is in a horizontal position or whether the ship is rolling so that the deck transversely is in two oppositely oblique positions;

Figure 4 is a diagrammatic side view of my invention as applied to the deck of a ship, and shows how the instrument is maintained in the same position, whether the ship's deck is in a horizontal position or whether the ship is pitching up or down so that the deck longitudinally is in two oppositely oblique positions;

Figure 5 is a diagrammatic plan view, showing both gyroscopes on vertical shafts;

Figure 6 is a diagrammatic plan view, showing one gyroscope on a vertical shaft and the other on a horizontal shaft;

Figure 7 is a view of a gyroscope as shown to the left in Figure 1, but with a motor attached;

Figure 8 is a side elevation of Figure 7; and

Figure 9 is a fragmental plan of the gimbal, and a pivot of one of the gyroscopes, and shows how the gimbal pivot is connected with the pivot of the gyroscope frame by means of a telescopic shaft and universal joints.

In the drawings the numeral 1 indicates a support, such as a deck or floor of a ship, locomotive, automobile, aeroplane, or any other body used in transportation and subjected to oscillating movements both longitudinally and transversely. On this deck I mount pivotally two gyroscopes 2 and 3, preferably opposite to each other. These gyroscopes are of the usual construction, the gyroscope 2 thus having a frame 4, the gyroscope 3 having a frame 5, and the frame 4 being provided with supporting pivots 6 arranged on a normally horizontal axis at right angles to the axis 7 of the gyroscope 2, while the frame 5 is provided with supporting pivots 8 arranged on a normally horizontal axis at right angles to the axis 9 of the gyroscope 3. The gyroscope frames are so arranged relative to each other that the axis of the supporting pivots 6 of the gyroscope 2 is at right angles to the axis of the supporting pivots 8 of the gyroscope 3, the pivots 6 for this purpose being rotatably supported in bearings 10 on suitable standards 11 secured to the deck 1, as shown in Figures 1 and 2, and the pivots 8 being in a similar manner rotatably supported in bearings 12 on suitable standards 13 also secured to the deck.

Above the deck 1 I preferably arrange another deck 14 and secure thereto standards 15 for supporting thereon a gimbal 16, which consists of an inner element in the form of a disk or ring 17 mounted on a pivotal axis by means of pivots 18 within an outer element or ring 19, and the pivots 20 of the outer element are arranged on an axis at right angles to the axis of the inner element and are rotatable in bearings 21 on the standards 15. An instrument 22, such as a searchlight, camera, or the like, is fixed to the inner element 17 in any suitable manner so that the instrument is thereby adapted to respond instantaneously at all times to the movemens by which the gimbal is maintained stabilized relative to a fixed plane.

In order to make the stabilizing tendency of the gyroscopes effective upon the gimbals 16, one of the pivots 18 of the inner gimbal-element 17, as shown in Figures 1 and 2, may be connected by means of a coupling 23 with one end of a flexible shaft 24 extending through an opening in the deck 14, while the other end of the shaft is connected by another coupling 25 with one of the pivots 8 of the gyroscope frame 5, and one of the pivots 20 of the outer gimbal-element 19 may be similarly connected by means of a coupling 26 with one end of a flexible shaft 27, which also extends through an opening in the deck 14, while the other end of the shaft is connected by another coupling 28 with one of the pivots 6 of the gyroscope frame 4. For the purpose of aiding the gyroscopes in their stabilizing tendency, the frames 4 and 5 may be further provided on their undersides with weights 29. Each of the gyroscopes may also be inclosed in a suitable housing 30, preferably provided with a cover 31 in order to allow access to the gyroscope.

Although I prefer to employ flexible shaft connections between the gimbal and the respective gyroscope frames, I may in some instances substitute for the flexible shafts 24 and 27 other shafts of a non-flexible nature.

Such a shaft 32 is shown in Figure 9 as being of the usual telescopic construction and having a universal-joint connection with the pivot 18 of the inner gimbal-element, and another universal-joint connection with the pivot 8 of the gyroscope frame 5.

It is evident that any suitable means for rotating the gyroscopes may be utilized, according to the specific requirements in each case. The rotating means shown in Figures 7 and 8 are therefore merely suggestive and not intended to illustrate any preferred mode of imparting rotative motion to the gyroscope. In this instance I illustrate the gyroscope 2 as having upon its shaft or axis 7 and near each end thereof mounted an armature 33, which rotates between field magnets 34 secured to the gyroscope frame by suitable supporting bars 35.

In Figures 1, 2, 3 and 4 the gyroscopes are shown as rotating on horizontal axes, but such an arrangement is not absolutely necessary, as is understood from the diagrammatic representation in Figure 5, in which both gyroscopes are shown as rotating on vertical axes, or from the diagrammatic representation in Figure 6, in which one gyroscope is shown as rotating on a vertical axis and the other gyroscope as rotating on a horizontal axis. In each instance, however, the axis of each gyroscope is at right angles to the axis of the supporting pivots of the gyroscope frame, and the axis of the supporting pivots of one gyroscope is at right angles to the axis of the supporting pivots of the other gyroscope.

Therefore, in operation, whether a ship or other supporting body has its deck in a horizontal position, as shown in Figures 1 and 2 and in the center of Figures 3 and 4, or whether the deck is oscillated to oppositely oblique positions when the ship is rolling, as shown to the left and the right in Figure 3, or when the ship is pitching, as shown to the left and the right in Figure 4, the searchlight or camera 22 is always maintained in its predetermined position, because the shafts 24, 27 or 32 so connect the respective supporting pivots of the gyroscope frames with the respective gimbal pivots as to transmit the stabilizing effect of the gyroscopes to the gimbal. Since thus the ship's oscillative movements in all directions are relatively non-effective upon the gyroscopes, and since the stabilizing tendency of the gyroscopes is transmitted by the shafts to the gimbal, it is possible by my arrangement to take pictures with a moving-picture camera or to emit the rays from a searchlight in a predetermined direction from the deck of a rolling or pitching ship with the assurance that such instruments will be held steadily in their required working positions.

I claim as my invention:

1. A gyroscopic stabilizer comprising two gyroscopes pivotally mounted on a support, the supporting pivots of each gyroscope being on a normally horizontal axis at right angles to the axis of the gyroscope, and the axis of the supporting pivots of one gyroscope being at right angles to the axis of the supporting pivots of the other gyroscope; a gimbal consisting of an inner element mounted on a pivotal axis within an outer element and adapted to have an instrument mounted thereon, the outer element being pivotally mounted upon said support on an axis at right angles to the axis of the inner element; a shaft connecting a pivot of one of the gyroscopes with one of the pivots of the inner element of the gimbal; and another shaft connecting one of the pivots of the other gyroscope with one of the pivots of the outer element of the gimbal.

2. A gyroscopic stabilizer comprising two gyroscopes pivotally mounted on a support, the supporting pivots of each gyroscope being on a normally horizontal axis at right angles to the axis of the gyroscope, and the axis of the supporting pivots of one gyroscope being at right angles to the axis of the supporting pivots of the other gyroscope; a gimbal consisting of an inner element mounted on a pivotal axis within an outer element and adapted to have an instrument mounted thereon, the outer element being pivotally mounted upon said support on an axis at right angles to the axis of the inner element; a flexible shaft connecting a pivot of one of the gyroscopes with one of the pivots of the inner element of the gimbal; and another flexible shaft connecting one of the pivots of the other gyroscope with one of the pivots of the outer element of the gimbal.

3. A gyroscopic stabilizer comprising two gyroscopes pivotally mounted on a support, the supporting pivots of each gyroscope being on an axis at right angles to the axis of the gyroscope, and the axis of the supporting pivots of one gyroscope being at right angles to the axis of the supporting pivots of the other gyroscope; a gimbal consisting of an inner element mounted on a pivotal axis within an outer element and adapted to have an instrument mounted thereon, the outer element being pivotally mounted upon said support on an axis at right angles to the axis of the inner element; a shaft connecting a pivot of one of the gyroscopes with one of the pivots of the inner element of the gimbal; another shaft connecting one of the pivots of the other gyroscope with one of the pivots of the outer element of the gimbal; and means for rotating the gyroscopes.

4. A gyroscopic stabilizer comprising two gyroscopes pivotally mounted on a support, the supporting pivots of each gyroscope being on an axis at right angles to the axis of the gyroscope, and the axis of the supporting pivots of one gyroscope being at right angles to the axis of the supporting pivots of the other gyroscope; a gimbal consisting of an inner element mounted on a pivotal axis within an outer element and adapted to have an instrument mounted thereon, the outer element being pivotally mounted upon said support on an axis at right angles to the axis of the inner element; a flexible shaft connecting a pivot of one of the gyroscopes with one of the pivots of the inner element of the gimbal; another flexible shaft connecting one of the pivots of the other gyroscope with one of the pivots of the outer element of the gimbal; and means for rotating the gyroscopes.

5. A gyroscopic stabilizer comprising two gyroscopes, each provided with a frame pivotally mounted on a support, the supporting pivots of each gyroscope being on a normally horizontal axis at right angles to the axis of the gyroscope, and the axis of the supporting pivots of one gyroscope being at right angles to the axis of the supporting pivots of the other gyroscope; a weight secured to each frame for aiding in the stabilizing tendency of the respective gyroscope; a gimbal consisting of an inner element mounted on a pivotal axis within an outer element and adapted to have an instrument mounted thereon, the outer element being pivotally mounted upon said support on an axis at right angles to the axis of the inner element; a shaft connecting a pivot of one of the gyroscopes with one of the pivots of the inner element of the gimbal; and another shaft connecting one of the pivots of the other gyroscope with one of the pivots of the outer element of the gimbal.

CASPER E. SCHUELLER.